Aug. 5, 1958 P. C. PEARSON 2,845,674
LINE TIGHTENER AND HOLDER
Filed Jan. 29, 1953

INVENTOR.
PHILIP C. PEARSON
BY Williamson, Williamson
Schroeder & Adams
ATTORNEYS

United States Patent Office 2,845,674
Patented Aug. 5, 1958

2,845,674
LINE TIGHTENER AND HOLDER

Philip C. Pearson, Duluth, Minn., assignor to The Titeliner Company, Minneapolis, Minn., a corporation of Minnesota Application January 29, 1953, Serial No. 333,896

3 Claims. (Cl. 24—134)

This invention relates to a device for facilitating the tightening of lines such as ropes, straps, flexible cables and the like and for securely holding a line in a taut condition.

The instant application is a continuation in most respects of my co-pending application, S. N. 221,927, filed April 19, 1951, now abandoned.

The prior art includes many line or rope holders but from my knowledge thereof, all of these are objectionable or defective in one or more respects. Many of the prior art devices are cumbersome and too expensive and do not securely hold lines or rope varying in cross sectional thickness. None of them provide in compact form, a device wherein a flexible line may be instantly and effectively tightened and locked securely and automatically when the tightened strain on the line is released. Those prior art devices which employ clamping cams or gripping dogs usually require manual setting of the clamp by lever manipulation and where such prior structures attempt the securing or clamping of a line upon release of tightening strain, the clamping or gripping dog or other member is not readily responsive, particularly in lines of different size and permits considerable slippage of the line before clamping and locking is effected.

It is an object of my invention to provide a very compact, inexpensive line tightener and holder which will very efficiently operate upon ropes and other flexible lines varying considerably in thickness, including recently marketed plastic coated rope and the like and wherein a particular camming and clamping element through its relation with a body and guide bore is immediately responsive after tightening of a line and release of the free end thereof, to securely clamp and lock said line in taut condition.

Another object is the provision of a device of the class described wherein its principles may be employed efficiently for operation upon straps or bands as well as lines, ropes and the like of circular cross sectional shape.

Another important object is the provision of a line tightener and holder having an improved line-guiding, camming and unobstructed clamping surface relation, whereby the line is wrapped around the periphery of the cam to a much greater degree than in previous line holders and wherein there is a more positive and responsive, rotative clamping action imparted to the cam to immediately lock and secure lines of various thickness without requiring manual setting of the clamping element.

These and other objects and advantages of my invention will more fully appear from the following description made in connection with the accompanying drawings wherein like reference characters refer to similar parts throughout the several views and in which;

Fig. 1 is a side elevation of efficient embodiment of my invention adapted to successfully operate upon flexible lines of circular cross section such as ropes, cords, small cables and the like;

Figure 1:
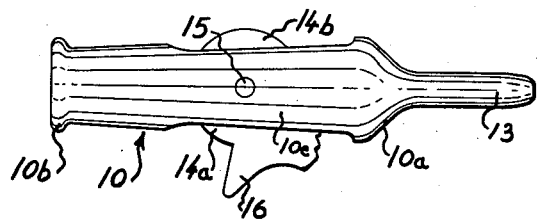
Figure 2:
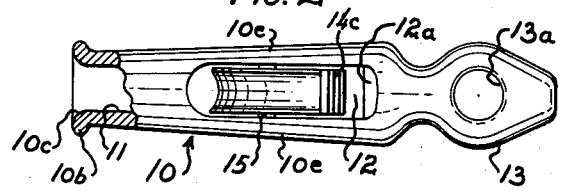
Fig. 2 is a top plan view of the same.
Figure 3:
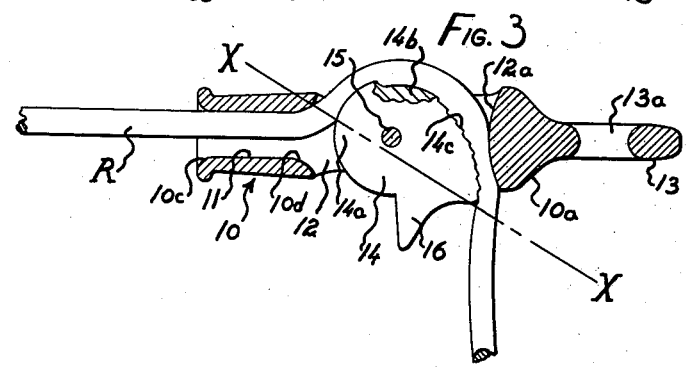
Fig. 3 is a vertical section taken longitudinally of the body and with a portion of the upper edge of the clamping cam being broken away and showing the device in operation securely locking a rope in taut condition.

Referring now to the form of my invention illustrated in Figs. 1 to 3 inclusive, I provide an elongated symmetrical body 10 which may be constructed of suitable rigid material such as metal, plastic or hard composition, said body, as shown, tapering slightly from the shoulders portion 10a thereof to the line entrance portion 10b. Said line entrance portion is in the form of a nicely rounded external bead and communicates with the open center of the body through a relatively large internal line guiding bore 11 extending axially of the body from the left hand extremity, as shown in the drawings, to and in communication with a relatively large transverse opening or slot 12 of generally oblong shape formed in the medial portion of the body and extending therethrough to afford open ends at top and bottom of the body as viewed in the drawings. The said transverse opening or slot is formed to define, at the rear of said opening, an unobstructed and slightly curved rear clamping wall 12a which is disposed perpendicularly to the axis of the line guiding bore 11. It will be noted that bore 11 at the forward end of the body merges into the bead 10b by formation of a rounded shoulder 10c and at its rear or inner portion gradually enlarges in diameter to provide a longitudinally rounded wall portion 10d which terminates at the forward end of the transverse opening 12.

Suitable means are provided at the right hand end of the body, preferably formed integrally with the body, for facilitating attachment of the device to a hook, loop or other attachment element. As shown, my structure in symmetrical relation to the remainder of the body integrally carries an ear 13 which is centrally apertured to form an attachment eye 13a, said ear and eye having the edges thereof nicely rounded to prevent cutting and to minimize wear upon the attachment element to which my device is connected.

A line-clamping cam 14 of peculiar construction is compactly pivoted by a transverse pivot pin 15 within the space or chamber provided by the large transverse opening 12 having a novel and highly efficient cooperative relation with the line guide bore 11 and the transverse rear clamping wall 12a. Cam 14, as shown, has parallel flat side walls nicely fitting with working clearance between the side portions 10e of the medial portion of the body and filling a substantial portion of the transverse opening 12. The pivot pin 15 is disposed eccentrically forward of the general configuration of cam 14 and lies almost in a position of perpendicular intersection to an extension of the axis of longitudinal center line of the guiding bore 11. The cam 14 is of generally volute shape having throughout most of its periphery a continuous volute or spiral peripheral edge constantly increasing in radius from pin 15 from the lower and forward end of the cam through the intermediate or upper portion thereof and through the rear portion or end of the cam.

The forward portion 14a of the cam is opposed to the inner end of guide bore 11 and is preferably grooved by an arcuate channel portion for very closely fitting a rope or other line of circular cross section, said channel continuing in volute form around the intermediate or upper portion 14b of the cam and merging into the rear end 14c which is not channeled, but which is rather coarsely roughened as by transverse ribs or teeth to oppose the clamping wall 12a defined by the large opening 12. It will further be noted that the configuration of the rear side or end 14c of the cam is tangential to a line disposed in close parallel relation with the rear clamping wall 12a and consequently is in close-to-tangential relation with that clamping wall. The intermediate side 14b of the cam, it will be noted, protrudes substantially above the adjacent or upper edge of the body at the transverse opening and in such protrusion extends to a position very materially off-set as contrasted with the axis or center line of the guiding bore 11.

I prefer to provide a radially projecting abutment 16 as shown in the form of a trigger integrally constructed with the body of cam 14, said abutment being adapted to limit clock-wise turning of the cam as viewed in Fig. 3 and, also, if necessary, providing a trigger for releasing the cam from clamping position if a compressible rope is very tightly clamped.

Operation

In the use of my device, the free end of a flexible line such as a rope is very easily passed through the guide bore 11 and guided into and over the arcuately channeled portion of the cam edge at the front side 14a and intermediate side 14b thereof being then passed downwardly between the rear end or edge 14c of the cam and the transverse, straight clamping wall 12a of the body. The relation of the cam, opening 12 and rear clamping wall 12a causes the cam to swing clock-wise if needed to accommodate the thickness of the rope during the described insertion of the free end.

The rope or other round line is then disposed as shown in Fig. 3, it, of course, being assumed that the eye 13a of the device is attached to a hook, loop or other fixed attachment element (not shown).

The line may then be readily tightened the desired amount by forcibly pulling downwardly upon the free projecting end thereof. In said pulling action, it will be noted that, with my improved construction, the rope R is very nicely guided through the forward end 14a of the cam and then entrains part of said forward end 14a, all of the intermediate portion 14b of the cam and all of the roughened or toothed rear portion 14c of the cam, actually surrounding considerably more than one-half or more than 200 degrees circumferentially of the volute edge of clamping element 14 (see Fig. 3). A line XX has been drawn considerably below the axis of pivot pin 15 to show the proportion of said edge of the cam over which the line is trained in my construction.

After tightening the rope or line R to the extent desired, immediately upon release of the free end of the line, cam 14 is slightly turned in counter clock-wise direction (as viewed in Fig. 3) being immediately responsive to release of strain because of the very substantial entrainment of the line. This results in a very positive and efficient clamping pressure and locking of the line as shown in Fig. 3 between the rear clamping wall 12a which extends perpendicularly to the inner guiding of the line and which further is disposed in close-to-tangential relation with the rear end of the volute edge. This particular relationship is important in that there is no slippage of the line relatively to the periphery of the cam in my structure as distinguished from prior art known to me and this condition is present with fairly heavy ropes as well as when substantially smaller twines or cord are employed as the flexible element or line.

Most of the prior art line holders are ineffective in clamping lines varying in cross sectional diameter and are very inefficient for holding a smooth slippery line such as the new plastic coated rope which is utilized extensively today. Many of the prior art devices for locking require manual manipulation of a radially extending arm or lever connected with the dog or cam to properly set the device.

With my structure, the locking or clamping of the line after tensioning of the same is instantaneous and automatic as previously described.

As previously stated, the abutment or trigger 16 of the cam limits clock-wise swinging thereof when the line is applied to the device before tightening, so that the cam can never be disposed when not in use out of proper line-receiving position.

Figure 6:
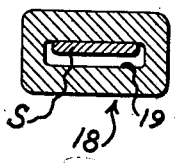
Fig. 6 is a cross section taken on the line 6—6 of Fig. 5.
Figure 5:
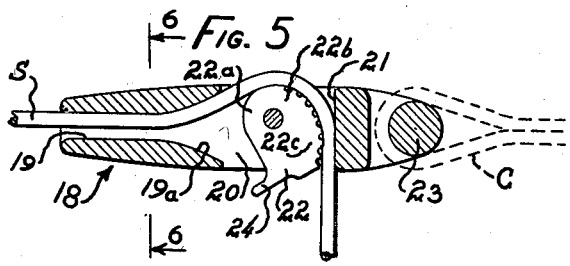
Fig. 5 is a vertical section taken longitudinally through the device of Fig. 4 showing a strap secured in taut condition.
Figure 4:
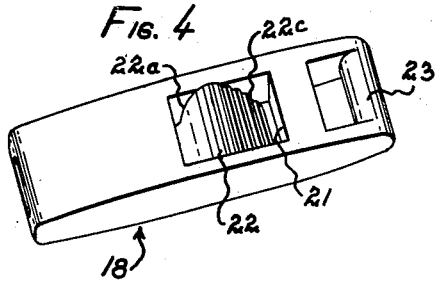
Fig. 4 is a top perspective view showing another embodiment of my invention particularly adapted for tensioning and holding straps or flexible metal bands, but also being capable inherently of efficient operation upon lines of circular cross section.

In Figs. 4 to 6 inclusive, the embodiment illustrated is adapted for application not only to ropes and lines of circular cross section, but is particularly constructed to receive a flat flexible band or strap S. The body 18, as shown, is of generally oblong shape having the entrance or guide bore 19 formed of smaller oblong cross sectional shape with rounded edges at the forward strap-receiving edge and having its rear portion, which communicates with the enlarged transverse opening or slot 20, gradually enlarging and formed with a longitudinally rounded wall portion 19a terminating at the forward end of said transverse opening. The rear clamping wall 21 defined by opening 20 is disposed transversely of the longitudinal center line of the bore 19 in the same relation to the guide bore and to the clamping cam 22 as the corresponding parts of the form of the invention previously described. The body 18 at its rear end is provided with an internally rounded eye 23 which is adapted to be easily attached to a hook, loop or other attachment element. As indicated by dotted lines in Fig. 5, a loop or a cable or strap C is attached to eye 23.

The clamping cam 22 has a volute peripheral edge generally similar to the shape and edge of the cam 14 of the form of the invention first described with the exception, however, that the forward end 22a of the cam and the intermediate portion 22b are not provided with a peripheral channel. The rear end 22c of the cam and a part of the intermediate portion 22b are rather coarsely roughened as by ribs or teeth and the shape of such portions confronts and is opposed to the rear clamping wall 21 in close-to-tangential relation. Cam 22 is provided with an outwardly projecting abutment or trigger element 24 having the same function as the abutment 16 of my first form.

The introduction of a flexible element such as strap S into the device shown in Figs. 4 to 6; the tensioning of the strap or line and the entire cooperation of the related parts are all similar to those of the form of my invention shown in Figs. 1 to 3.

From the foregoing description, it will be seen that I have provided a simple, inexpensive but highly efficient device of very compact but rugged form for efficiently facilitating the tightening of various flexible lines and for very securely holding lines in taut condition.

It will further be seen that, with the cooperation of my line guiding means, peculiar clamping cam and body, including the transverse clamping wall, the device is remarkably efficient for lines of varying size and diameter. The actuation of the clamping operation is purely automatic with my structure immediately upon slight release of the free end of the line after tightening operation has been completed.

It will, of course, be understood that various changes may be made in the form, details, arrangement and proportions of the parts without departing from the scope of my invention which consists of the matter shown and described herein and set forth in the appended claims.

What I claim is:

1. A compact device for facilitating the tightening of and for holding and retaining a line taut comprising an elongated, substantially straight body having front and rear ends, said body being formed with a longitudinal bore constituting a line guide leading from its front end to the intermediate portion thereof, said body having a relatively large transverse opening or slot formed through the intermediate portion thereof, open at both ends and communicating with the rear of said longitudinal bore, said transverse opening defining an unobstructed, substantially straight, rear, clamping wall disposed substantially perpendicularly to the axis of said bore, said bore having its rear portion gradually enlarging and formed with a longitudinally rounded wall portion terminating at the forward end of said transverse opening, a clamping cam of generally volute shape compactly and pivotally mounted in said opening upon a pin affixed to said body and disposed at least close to a position of intersection with the longitudinal center line of said bore, said cam having a continuous peripheral edge extending along front and rear sides of the cam and including a smooth groove portion intermediate of said front and rear sides, said intermediate portion of said edge protruding and offset substantially beyond and outwardly of said longitudinal bore, the rear portion of said edge being substantially roughened and being disposed in confronting and close-to-tangential relation to the rear, unobstructed wall of said opening, the side of said cam opposite from said intermediate portion having a substantially radial abutment projecting therefrom for engagement with the front wall of said opening to limit tilting movement of the cam in a releasing direction.

2. A device for holding a line taut comprising an elongated body having front and rear ends, said body being formed with an elongated longitudinal bore leading from its front end, the rear end of said bore communicating with an opening extending transversely through the body and having open ends at opposite sides of the body, said opening having an unobstructed rear clamping wall perpendicular to the axis of the bore, said bore having its rear portion gradually enlarged and formed with a longitudinally arcuate wall portion terminating at one end of the front side of the transverse opening, a cam in said opening pivotally mounted by a pin disposed in forwardly eccentric relation to the cam and extending perpendicular to said bore, lying at least close to a position of intersection with the extended center line of said bore, said cam having a continuous peripheral edge face extending along front and rear sides of the cam and across one end of the cam, the said end of said cam protruding from the said end of said opening and being offset substantially from said longitudinal bore, the forward portion of the said edge face of said cam being smooth and merging into a smooth grooved portion extending across the said end of the cam and merging into a portion extending along the rear portion of the cam in confronting relation to the rear wall of the opening and cooperating with the said rear wall to grip a cord, the said rear portion of the said edge face of the cam being toothed and the adjoining end portion of the arcuate portion extending across the said end of the cam also being toothed, the other end portion of said cam also projecting from a side of the body at the other end of the opening and being provided with a trigger for tilting the cam out of a gripping position, said trigger extending from the last mentioned end of the cam forwardly of the body and being of a length adapting it to overlap a portion of the body in front of the last mentioned end of said opening and thereby limit tilting movement of the cam in a releasing direction.

3. A line tightening and holding device comprising an elongated body of substantially cylindrical form slightly tapered and having an eye formed in extension of its larger end and an axial bore through its smaller end, said bore communicating with a diametral slot through the mid portion of said body, a cam pivotally mounted in said slot and having a concentric smooth circumferential groove extending around substantially half of its periphery and a roughened volute groove extending therefrom around substantially 90° more of the cam to a radius closely approximating the distance to the end wall of said slot nearest said larger end of said body, and a projection extending from the periphery of said cam adjacent the other end of said smooth groove serving as a stop against the smaller end of said body so as to present a smooth guide groove surface over which a line, passed through said axial bore, over said cam groove and between the cam and the other end of said slot, may be drawn taut by pulling its free end over said smooth groove, and will immediately be firmly gripped between said roughened volute portion of said cam and said end wall of the slot when the free end of the line is released.

References Cited in the file of this patent

UNITED STATES PATENTS

| | | |
|---|---|---|
| 223,556 | Thayer | Jan. 13, 1880 |
| 449,567 | Nief | Mar. 31, 1891 |
| 511,310 | Pugh | Dec. 19, 1893 |
| 513,768 | Dunn | Jan. 30, 1894 |
| 921,458 | Raithel | May 11, 1909 |
| 924,425 | Burnard | June 8, 1909 |
| 1,067,412 | Eckhardt | July 15, 1913 |
| 1,208,108 | Davis | Dec. 12, 1916 |
| 1,385,837 | Kistner | July 26, 1921 |
| 2,493,907 | Wolff | Jan. 10, 1950 |

FOREIGN PATENTS

| | | |
|---|---|---|
| 128,033 | Great Britain | June 19, 1919 |